United States Patent [19]
Shiraishi et al.

[11] Patent Number: 5,693,404
[45] Date of Patent: Dec. 2, 1997

[54] AUTOMOBILE WINDOW GLASS WITH SHADE BAND

[75] Inventors: Yasunori Shiraishi; Toyoyuki Teranishi, both of Osaka, Japan

[73] Assignee: Nippon Sheet Glass Co., Ltd., Osaka, Japan

[21] Appl. No.: 324,725

[22] Filed: Oct. 18, 1994

[30] Foreign Application Priority Data

Oct. 18, 1993 [JP] Japan ................. 5-056141 U

[51] Int. Cl.[6] ........................................ B32B 17/00
[52] U.S. Cl. .................... 428/156; 428/157; 428/172; 428/428; 428/429; 428/432; 428/433; 428/434; 428/446; 428/701; 428/702
[58] Field of Search .................... 428/156, 172, 428/157, 428, 429, 434, 432, 433, 446, 701, 702; 106/1.18, 1.26, 1.23; 296/84.1

[56] References Cited

U.S. PATENT DOCUMENTS

| | | | |
|---|---|---|---|
| 3,208,070 | 9/1965 | Boicey | 296/84.1 |
| 3,887,383 | 6/1975 | Nesteruk | 106/1.23 |
| 4,098,949 | 7/1978 | Kosiorek | 428/434 |
| 4,418,099 | 11/1983 | Cuevas et al. | 427/229 |
| 4,594,107 | 6/1986 | Wild | 106/1.18 |
| 5,137,560 | 8/1992 | Ohmura et al. | 65/60 |
| 5,451,280 | 9/1995 | Gillner | 106/1.18 |

FOREIGN PATENT DOCUMENTS

| | | |
|---|---|---|
| 1 270 513 | 7/1961 | France . |
| 10 61 979 | 7/1959 | Germany . |
| 28 41 287 A 1 | 4/1980 | Germany . |
| 42 03 772 C 1 | 6/1993 | Germany . |
| 5-14454 | 2/1981 | Japan . |
| 5-95854 | 6/1982 | Japan . |

*Primary Examiner*—Timothy Speer
*Attorney, Agent, or Firm*—Merchant, Gould, Smith, Edell, Welter & Schmidt, P.A.

[57] ABSTRACT

An automobile window glass has a transparent colored film coated as a shade band on a sheet of glass along a longitudinal edge thereof. The transparent colored film comprises a coated paste made of Au, Si, and at least one transition metal selected from the group consisting of V, Fe, Cu, Co, Cr, Mo, Mn, Bi, W, Rh, Pd, and Pt. The transparent colored film has a varying thickness in a transverse direction across the longitudinal edge of the sheet of glass.

3 Claims, 2 Drawing Sheets

AUTOMOBILE WINDOW GLASS WITH SHADE BAND

BACKGROUND OF THE INVENTION

1. Field of the Invention

The present invention relates to an automobile window glass comprising a sheet of glass coated with transparent colored film as a shade band, and an apparatus for manufacturing such an automobile window glass with a shade band.

2. Description of the Prior Art

Heretofore, it has been customary to apply a transparent colored film to a sheet of glass according to an Ag staining process, as disclosed in Japanese laid-open patent publications Nos. 56-14454 and 57-95854, for example.

The conventional Ag staining process is, however, disadvantageous because the transparent colored film formed on the sheet of glass tends to suffer abrupt color irregularities because Ag ions are diffused into a surface layer of the glass to different degrees depending on the temperature.

Another problem of the transparent colored film produced by the conventional Ag staining process is that the film lacks sufficient practical durability as it may peel off easily when rubbed lightly by paper due to poor abrasion resistance and its low acid resistance allows to be dissolved by contact with a battery solution.

SUMMARY OF THE INVENTION

It is therefore an object of the present invention to provide an automobile window glass with a shade band which is highly durable and aesthetically attractive, and an apparatus for manufacturing such an automobile window glass with a shade band.

According to the present invention, there is provided an automobile window glass comprising a sheet of glass, and a transparent colored film disposed as a shade band on the sheet of glass, the transparent colored film comprising a coated paste made of Au, Si, and at least one transition metal selected from the group consisting of V, Fe, Cu, Co, Cr, Mo, Mn, Bi, W, Rh, Pd, and Pt, the transparent colored film having a varying thickness along a surface of the sheet of glass.

Preferably, the coated paste is made of 5 parts of pine oil, 10 parts of rosemary oil with fine powder of Au dissolved therein, 0.1 part of urea resin, 1 part of vanadium naphthenate, 2 parts of bismuth naphthenate, 2 parts of iron acetylacetonate, 1 part of methanol silica sol, and 15 parts of tetraisopropoxysilane.

The sheet of glass may be elongate, and the transparent colored film may be disposed along a longitudinal edge of the sheet of glass and progressively smaller in thickness in a transverse direction of the sheet of glass away from the longitudinal edge thereof.

The shades of colloidal coloring produced by Au are not affected by the temperature, and the colored film does not suffer abrupt color irregularities. The colored film is rendered very hard by an Si compound.

According to the present invention, there is also provided an apparatus for manufacturing an automobile window glass with a shade band, comprising a rubber roll supported on a flexible shaft for coating a paste on a sheet of glass, a doctor blade positioned adjacent to the rubber roller for supplying the paste at a constant rate to the rubber roll, a bending blade held against the rubber roll for bending the rubber roll to create a progressively varying gap between the sheet of glass and the rubber roll, so that the paste can be coated within the progressively varying gap to a progressively varying thickness on the sheet of glass, and a conveyor disposed underneath the rubber roll for feeding the sheet of glass in a direction across the rubber roll.

The bending blade may have an arcuate shape for bending said rubber roll arcuately to hold an axial end of the rubber roll in contact with the sheet of glass remotely from an edge thereof, so that the thickness of the paste coated on the sheet of glass will be progressively smaller from the edge of the sheet of glass toward said axial end of the rubber roll.

The conveyor may comprise an endless belt for placing the sheet of glass thereon, and a presser roll is positioned beneath and held against the endless belt for pressing the sheet of glass on the endless belt against the rubber roll.

Therefore, paste coated on the sheet of glass is progressively smaller in thickness from the edge of the sheet of glass toward the axial end of the rubber roll which is held against the sheet of glass.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

A paste 2 (see FIGS. 1 through 3) to be coated on an elongate sheet 1 of glass is prepared as follows: 5 parts of pine oil are added to 10 parts of rosemary oil with fine powder of Au dissolved therein and 0.1 part of urea resin. To the mixture, there are added 1 part of vanadium naphthenate, 2 parts of bismuth naphthenate, 2 parts of iron acetylacetonate (trivalent), 1 part of methanol silica sol, and 15 parts of tetraisopropoxysilane.

Figure 1:
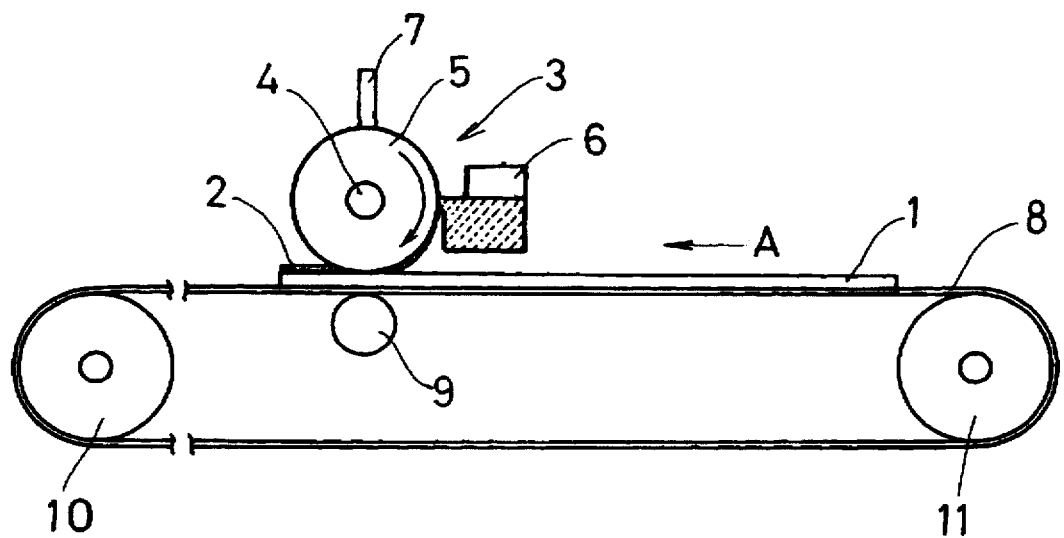
FIG. 1 is a side elevational view of an apparatus for manufacturing an automobile window glass with a shade band.

The paste 2 is coated on the sheet 1 of glass to a gradually varying thickness by a roll coater 3 shown in FIG. 1. The roll coater 3 comprises a rubber roll 5 supported on a flexible shaft 4 for coating the paste 2 to the sheet 1 of glass, a doctor blade 6 positioned adjacent to the rubber roll 5 for supplying the paste 2 at a constant rate to the rubber roll 5, an arcuate bending blade 7 held against the rubber roll 5 for bending the rubber roll 5 arcuately to create a progressively varying gap between the sheet 1 of glass and the rubber roll 5, and a conveyor 8 disposed underneath the rubber roll 5 for feeding the sheet 1 of glass in the direction indicated by the arrow A in FIG. 1 across the rubber roll 5. Specifically, the conveyor 8 is in the form of an endless belt trained around a pair of spaced conveyor rolls 10, 11. The roller coater 3 is positioned above the upper run of the endless belt such that the sheet 1 of glass as it is fed by the conveyor 8 is placed between the rubber roll 5 and the upper run of the endless belt. A presser roll 9 is positioned beneath and held against the upper run of the end-less belt for applying a predetermined pressure to the sheet 1 of glass on the conveyor 8.

Figure 2:
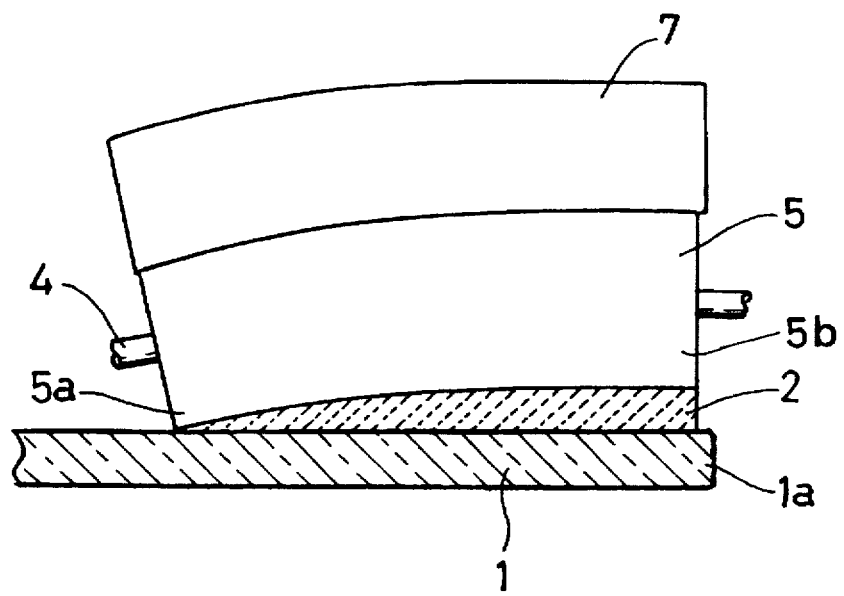
FIG. 2 is an enlarged fragmentary elevational view, partly in cross section, of a portion of the apparatus shown in FIG. 1.

The rubber roll 5 is supplied with the paste 2 at a constant rate by the doctor blade 6. The rubber roll 5 is supported on the shaft 4, which incorporates flexible joints. As shown in FIG. 2, the rubber roll 5 is flexed to an arcuate shape complementary to the bending blade 7 until one axial end 5a thereof is held in direct contact with the sheet 1 of glass remotely from a longitudinal edge 1a thereof. The rubber roll 5 has an opposite axial end 5b positioned substantially in alignment with and spaced upwardly from the longitudinal edge 1a of the sheet 1 of glass.

Figure 3:
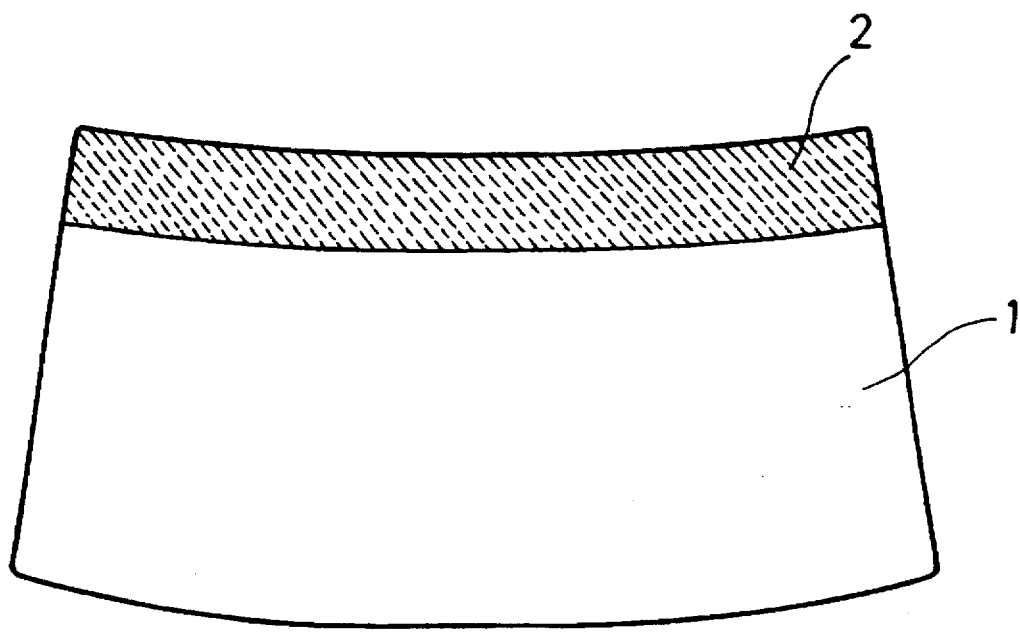
FIG. 3 is a plan view of a sheet of glass coated with a paste by the apparatus shown in FIG. 1.

The gap between the sheet 1 of glass and the rubber roll 5 is therefore progressively smaller or tapered in the transverse direction of the sheet 1 of glass from the end 5b of the rubber roll 5 or the edge 1a of the sheet 1 of glass toward the end 5a of the rubber roll 5. Accordingly, the paste 2 coated within the gap on the sheet 1 of glass by the rubber roll 5 also has its thickness progressively smaller in the transverse direction of the sheet 1 of glass from the end 5b of the rubber roll 5 or the edge 1a of the sheet 1 of glass toward the end 5a of the rubber roll 5. When the conveyor 8 continuously feeds the sheet 1 of glass in the direction indicated by the arrow A in FIG. 1, the paste 2 is continuously coated as a paste strip on the sheet 1 of glass along the edge 1a thereof, as shown in FIG. 3.

The sheet 1 of glass to which the paste 2 has been applied is dried at 120° C. for 10 minutes, then heated at a temperature ranging from 600° C. to 750° C., and thereafter thermally tempered by air jets. As a result, the sheet 1 of glass is tempered which is coated with the fired paste 2 as a colored film. The colored film on the sheet 1 of glass is almost free of any abrupt color irregularities, and serves as a highly aesthetically attractive shade band that provides a continuous range of shades of color due to the varying thickness of the applied paste 2.

The shade band on the tempered sheet 1 of glass was checked for abrasion resistance by Taber abrader. After tested in 100 revolutions under a load of 500 g, the haze ratio changed 1% or less. After the tempered sheet 1 of glass with the shade band was immersed in 0.1N sulfuric acid, the transmittance of the shade band changed 1% or less, indicating that the shade band or the colored film was highly resistant to acid.

The types and amounts of transition metals in the paste 2 are adjusted to achieve a desired color and transmittance of the shade band. The transition metals may be added in any of various forms, e.g., fine metal powder, fine metal oxide powder, metal salts of inorganic acid, and organic metal compounds, which are highly compatible with a solvent or resin used or highly dispersible.

An Si compound added for increased abrasion resistance may be colloidal silica or a silane coupling agent.

The paste 2 may be coated by processes other than the process using the roll coater 3. For example, the paste 2 may be coated by the screen printing process. In the screen printing process, a screen having a pattern of very fine dot gradations is used to vary the area in which the paste is coated or the thickness of the film on the sheet of glass. The resultant shade band on the sheet 1 of glass has a continuous range of shades of color.

Rather than being thermally tempered by air jets, the sheet 1 of glass may be annealed, and a film of PVB (polyvinyl butyral) may be applied to the sheet 1 of glass, thus producing a laminated sheet of glass.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. An automobile window glass comprising:

a sheet of glass; and a transparent colored film disposed as a shade band on said sheet of glass, said transparent colored film comprising a paste which has been dried after application to said sheet of glass, said paste including therein Au, Si, and at least one transition metal selected from the group consisting of V, Fe, Cu, Co, Cr, Mo, Mn, Bi, W, Rh, Pd and Pt, said transparent colored film having a varying thickness along a surface of said sheet of glass.

2. An automobile window glass according to claim 1, wherein said paste is made of 5 parts of pine oil, 10 parts of rosemary oil with fine powder of Au dissolved therein, 0.1 part of urea resin, 1 part of vanadium naphthenate, parts of bismuth naphthenate, 2 parts of iron acetylacetonate, 1 part of methanol silica sol, and 15 parts of tetraisopropoxysilane.

3. An automobile window glass according to claim 1, wherein said sheet of glass is elongate, and said transparent colored film is disposed along a longitudinal edge of said sheet of glass and progressively smaller in thickness in a transverse direction of said sheet of glass away from said longitudinal edge thereof.

* * * * *